US009752585B2

(12) United States Patent
Kupratis (10) Patent No.: US 9,752,585 B2
(45) Date of Patent: Sep. 5, 2017

(54) GAS TURBINE ENGINE ARCHITECTURE WITH INTERCOOLED TWIN CENTRIFUGAL COMPRESSOR

(71) Applicant: United Technologies Corporation, Hartford, CT (US)

(72) Inventor: Daniel B. Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 699 days.

(21) Appl. No.: 14/209,326

(22) Filed: Mar. 13, 2014

(65) Prior Publication Data

US 2014/0271121 A1    Sep. 18, 2014

Related U.S. Application Data

(60) Provisional application No. 61/786,837, filed on Mar. 15, 2013.

(51) Int. Cl.
| | | |
|---|---|---|
| F04D 17/12 | (2006.01) | |
| F02C 3/08 | (2006.01) | |
| F02C 7/143 | (2006.01) | |
| F04D 29/58 | (2006.01) | |
| F01D 9/02 | (2006.01) | |
| F02K 3/075 | (2006.01) | |
| F02C 3/107 | (2006.01) | |

(52) U.S. Cl.
CPC ............... *F04D 17/12* (2013.01); *F01D 9/02* (2013.01); *F02C 3/08* (2013.01); *F02C 3/107* (2013.01); *F02C 7/143* (2013.01); *F02K 3/075* (2013.01); *F04D 29/5833* (2013.01); *F05D 2220/324* (2013.01); *F05D 2250/311* (2013.01); *F05D 2260/40311* (2013.01); *Y02T 50/675* (2013.01)

(58) Field of Classification Search
CPC .... F02C 3/08; F02C 7/143; F02C 7/12; F02C 7/141; F02K 3/075; F02K 3/077; F04D 29/5833
See application file for complete search history.

(56) References Cited

U.S. PATENT DOCUMENTS

| | | | |
|---|---|---|---|
| 4,081,957 | A | 4/1978 | Cox, Jr. |
| 4,164,845 | A | 8/1979 | Radin |
| 4,170,110 | A | 10/1979 | Radin |
| 4,315,714 | A | 2/1982 | Exley et al. |
| 4,368,005 | A | 1/1983 | Exley et al. |
| 4,527,386 | A | 7/1985 | Markowski |
| 4,538,410 | A | 9/1985 | Klaebo |
| 4,573,868 | A | 3/1986 | Stroem et al. |
| 4,590,759 | A | 5/1986 | Blizzard |
| 4,640,091 | A | 2/1987 | Blizzard |
| 4,827,712 | A | 5/1989 | Coplin |
| 5,105,617 | A | 4/1992 | Malohn |
| 5,323,603 | A | 6/1994 | Malohn |
| 6,035,627 | A | 3/2000 | Liu |
| 6,092,361 | A | 7/2000 | Romani |
| 6,134,880 | A * | 10/2000 | Yoshinaka ............. F02C 7/143 60/226.1 |

(Continued)

*Primary Examiner* — Nathaniel Wiehe
*Assistant Examiner* — Brian O Peters
(74) *Attorney, Agent, or Firm* — O'Shea Getz P.C.

(57) ABSTRACT

A gas turbine engine includes an intercooled twin centrifugal compressor. A pipe diffuser extends from the intercooled twin centrifugal compressor into an airflow path.

20 Claims, 7 Drawing Sheets

(56) References Cited

U.S. PATENT DOCUMENTS

| | | | |
|---|---|---|---|
| 6,183,195 B1 | 2/2001 | Fujinaka | |
| 6,200,094 B1 | 3/2001 | Skoch et al. | |
| 6,488,469 B1 | 12/2002 | Youssef et al. | |
| 6,520,286 B1 | 2/2003 | Frederiksen et al. | |
| 6,589,015 B1 | 7/2003 | Roberts et al. | |
| 6,966,174 B2 * | 11/2005 | Paul .................... | B64C 29/0075 60/224 |
| 7,254,949 B2 | 8/2007 | Brasz et al. | |
| 7,281,379 B2 | 10/2007 | Brasz | |
| 7,628,583 B2 | 12/2009 | Roberts et al. | |

\* cited by examiner

GAS TURBINE ENGINE ARCHITECTURE WITH INTERCOOLED TWIN CENTRIFUGAL COMPRESSOR

This application claims priority to U.S. Patent Appln. No. 61/786,837 filed Mar. 15, 2013.

BACKGROUND

The present disclosure relates to a gas turbine engine architecture, and more particularly to an intercooled twin centrifugal compressor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases.

Airflow thermal loads within the gas turbine engine vary and are controlled with various systems and methods. Intercooling is an effective scheme to control airflow temperatures, however, configuration of the intercooler as an integral part of the engine may be complex due to the necessity to reroute the airflow through a heat exchanger and transfer the heat from the airflow to a viable heat sink.

SUMMARY

A gas turbine engine according to one disclosed non-limiting embodiment of the present disclosure includes an intercooled twin centrifugal compressor, and a pipe diffuser extending from the intercooled twin centrifugal compressor into an airflow path.

In a further embodiment of the present disclosure, the airflow path is a third stream airflow path.

In a further embodiment of any of the foregoing embodiments of the present disclosure, the airflow path is a bypass airflow path.

In a further embodiment of any of the foregoing embodiments of the present disclosure, the pipe diffuser forms a cage-like screen around a Common Inlet Plenum in communication with the intercooled twin centrifugal compressor.

In a further embodiment of any of the foregoing embodiments of the present disclosure, the pipe diffuser extends around a Common Inlet Plenum in communication with the intercooled twin centrifugal compressor.

In a further embodiment of any of the foregoing embodiments of the present disclosure, the intercooled twin centrifugal compressor includes a forward centrifugal impeller and an aft centrifugal impeller located respectively at the fore end and aft end of the Common Inlet Plenum.

In a further embodiment of any of the foregoing embodiments of the present disclosure, the forward centrifugal impeller communicates with the aft centrifugal impeller through the pipe diffuser.

In a further embodiment of any of the foregoing embodiments of the present disclosure, the pipe diffuser includes a forward manifold and an aft manifold.

In a further embodiment of any of the foregoing embodiments of the present disclosure, the forward manifold includes a multiple of manifold pipes, each of the multiple of manifold pipes includes a radial outward pipe, an axial pipe downstream of the radial outward pipe and a radial inward pipe downstream of the axial pipe.

In a further embodiment of any of the foregoing embodiments of the present disclosure, the radial inward pipe and the aft manifold combine downstream into a full annular duct.

In a further embodiment of any of the foregoing embodiments of the present disclosure, the full annular duct communicates with a high pressure compressor.

A further embodiment of any of the foregoing embodiments of the present disclosure includes a heat exchanger within the airflow path, which heat exchanger is in communication with the axial pipe.

In a further embodiment of any of the foregoing embodiments of the present disclosure, the airflow path is a third stream airflow path.

A further embodiment of any of the foregoing embodiments of the present disclosure includes a heat exchanger within the airflow path, which heat exchanger is in communication with the pipe diffuser.

In a further embodiment of any of the foregoing embodiments of the present disclosure, the airflow path is a third stream airflow path.

A method of operating a gas turbine engine according to another disclosed non-limiting embodiment of the present disclosure includes extending a pipe diffuser from an intercooled twin centrifugal compressor into an airflow path.

A further embodiment of any of the foregoing embodiments of the present disclosure includes extending the pipe diffuser into a third stream airflow path.

A further embodiment of any of the foregoing embodiments of the present disclosure includes communicating the pipe diffuser with a heat exchanger within the third stream airflow path.

A further embodiment of any of the foregoing embodiments of the present disclosure includes mixing half of a core airflow from the intercooled twin centrifugal compressor with a cooled half of the core airflow from the intercooled twin centrifugal compressor.

A further embodiment of any of the foregoing embodiments of the present disclosure includes mixing the core airflow upstream of a high pressure compressor.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
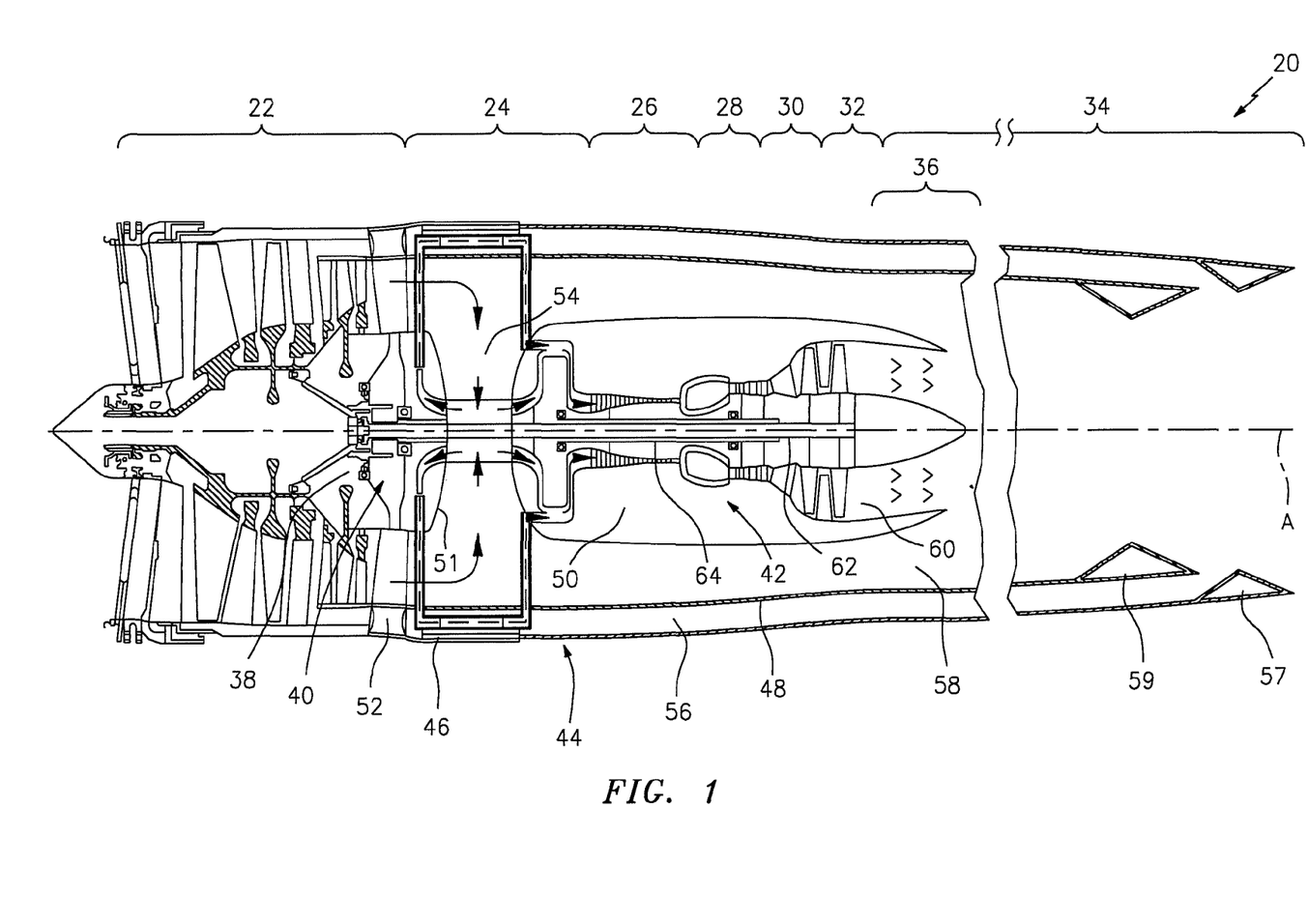
FIG. 1 is a schematic view of an exemplary variable cycle gas turbine engine according to one non-limiting embodiment.

FIG. 1 schematically illustrates a gas turbine engine 20 according to one disclosed non-limiting embodiment. The gas turbine engine 20 is disclosed herein as a variable cycle two-spool bypass turbofan that generally includes a fan 22, an intercooled twin centrifugal compressor 24, a high pressure compressor (HPC) 26, a combustor 28, a high pressure turbine (HPT) 30, a low pressure turbine (LPT) 32, and a nozzle 34. The sections are axially defined along a central longitudinal engine axis A. Additional sections and/or features may include an augmentor 36, and a geared architecture 38 which may be located in various engine sections other than that shown. An exemplary geared architecture 38 is an epicyclic transmission, namely a planetary or star gear system. Furthermore, other architectures, such as three-spool architectures, turbofan, turboshaft engines will also benefit herefrom.

The engine 20 generally includes a low spool 40 and a high spool 42 that rotate about the engine central longitudinal axis A relative to an engine case structure 44. The engine case structure 44 generally includes an outer case structure 46, an intermediate case structure 48 and an inner case structure 50. It should be understood that various structures individual or collectively may define the case structures 48 to essentially define an exoskeleton that supports the spools 40, 42 for rotation therein.

The fan 22 communicates airflow through an airflow control mechanism 52 into a third stream airflow path 56 typical of a variable cycle engine, a second stream airflow path 58 and, through the intercooled twin centrifugal compressor 24, a core primary airflow path 60. The core primary airflow path 60 communicates through the HPC 26, the combustor 28, the HPT 30 and the low pressure turbine (LPT) 32.

The airflow control mechanism 52 may include various structures such as electric, pneumatic or mechanically operated blocker doors or relatively movable vanes that operate as a throttle point to define a variable area throat to facilitate variable cycle operations. Variable cycle gas turbine engines power aircraft over a range of operating conditions yet achieve countervailing objectives such as high specific thrust and low fuel consumption. The airflow control mechanism 52 essentially alters a bypass ratio during flight to match requirements. This facilitates efficient performance over a broad range of altitudes and flight conditions to generate high thrust for high-energy maneuvers yet optimize fuel efficiency for cruise and loiter. The airflow control mechanism 52 is selectively operable to control airflow through the third stream airflow path 56 and/or second airflow path 58 such that a selective percentage of airflow from the fan 22 is divided between the third stream airflow path 56 as well as both the second stream airflow path 58 and core primary airflow path 60. In the disclosed non-limiting embodiment, the airflow control mechanism 52 may throttle the airflow into the third stream airflow path 56 down to a minimal but non-zero airflow.

The intercooled twin centrifugal compressor 24 and the low pressure turbine (LPT) 32 are coupled by a low shaft 62 which is also coupled to the fan 22 either directly or through the geared architecture 38 to define the low spool 40. It should be appreciated that various single or multistage architectures may alternatively or additionally be provided with various combinations of fixed and/or variable vanes.

The high pressure compressor (HPC) 26 and the high pressure turbine (HPT) 30 are coupled by a high shaft 64 to define the high spool 42. It should be appreciated that various single or multistage architectures may alternatively or additionally be provided with various combinations of fixed and/or variable vanes. The high pressure compressor (HPC) 26, the combustor 28 and the HPT 30 are often referred to as the gas generator.

The fan 22 communicates airflow into the third stream airflow path 56, the second stream airflow path 58 and the core airflow path 60 through the intercooled twin centrifugal compressor 24. The fan 22 may alternatively or additionally include other architectures that, for example, include additional or fewer stages each with or without various combinations of variable or fixed guide vanes.

The third stream airflow path 56 is generally annular in cross-section and defined by the outer case structure 46 and the intermediate case structure 48. The second stream airflow path 58 is also generally annular in cross-section and defined by the intermediate case structure 48 and the inner case structure 50. The core primary airflow path 60 is defined by the inner case structure 51 and an intake 54 through the intercooled twin centrifugal compressor 24. The second stream airflow path 58 is defined radially inward of the third stream airflow path 56 and the core primary airflow path 60 is radially inward of the second stream airflow path 58. Various crossover and cross-communication airflow paths may alternatively or additionally be provided.

The core airflow is compressed by the intercooled twin centrifugal compressor 24, communicated to the HPC 26, mixed and burned with fuel in the combustor 28, then expanded over the high pressure turbine (HPT) 30 and the low pressure turbine (LPT) 32. The turbines 30, 32 rotationally drive the respective high spool 42 and low spool 40 in response to expansion. Each of the turbines 30, 32 may alternatively or additionally include other architectures that, for example, include additional or fewer stages each with or without various combinations of variable or fixed guide vanes.

The nozzle 34 may include a third stream exhaust nozzle 57 (illustrated schematically) which receives airflow from the third stream airflow path 56 and a mixed airflow exhaust nozzle 59 (illustrated schematically) which receives a mixed airflow from the second stream airflow path 58 and the core primary airflow path 60. It should be understood that various fixed, variable, convergent/divergent, two-dimensional and three-dimensional nozzle systems may be utilized herewith.

Figure 2:
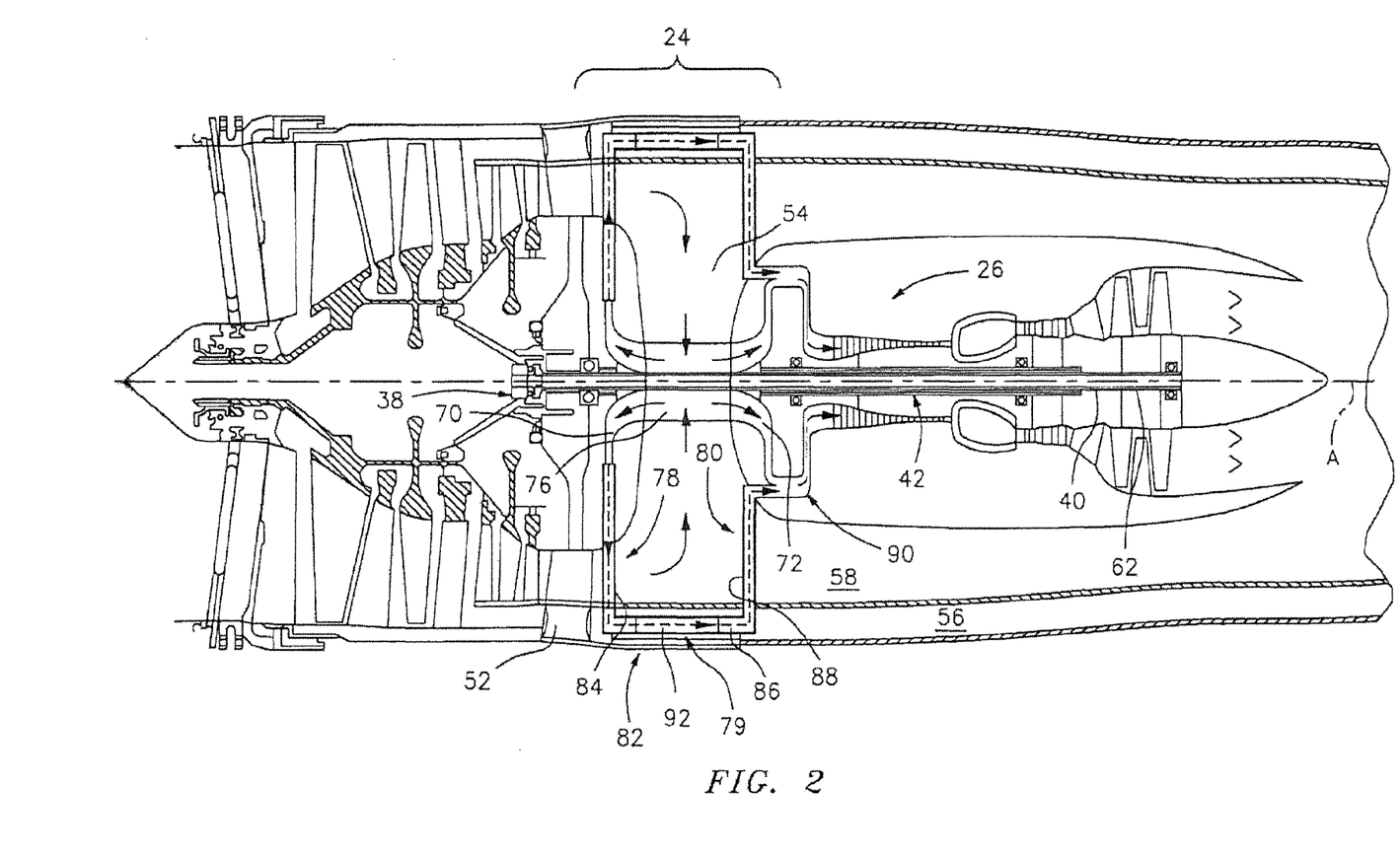
FIG. 2 is an expanded view of the variable cycle gas turbine engine of FIG. 1 with a low spool that includes a forward centrifugal impeller and an aft centrifugal impeller on a low shaft.
Figure 3:
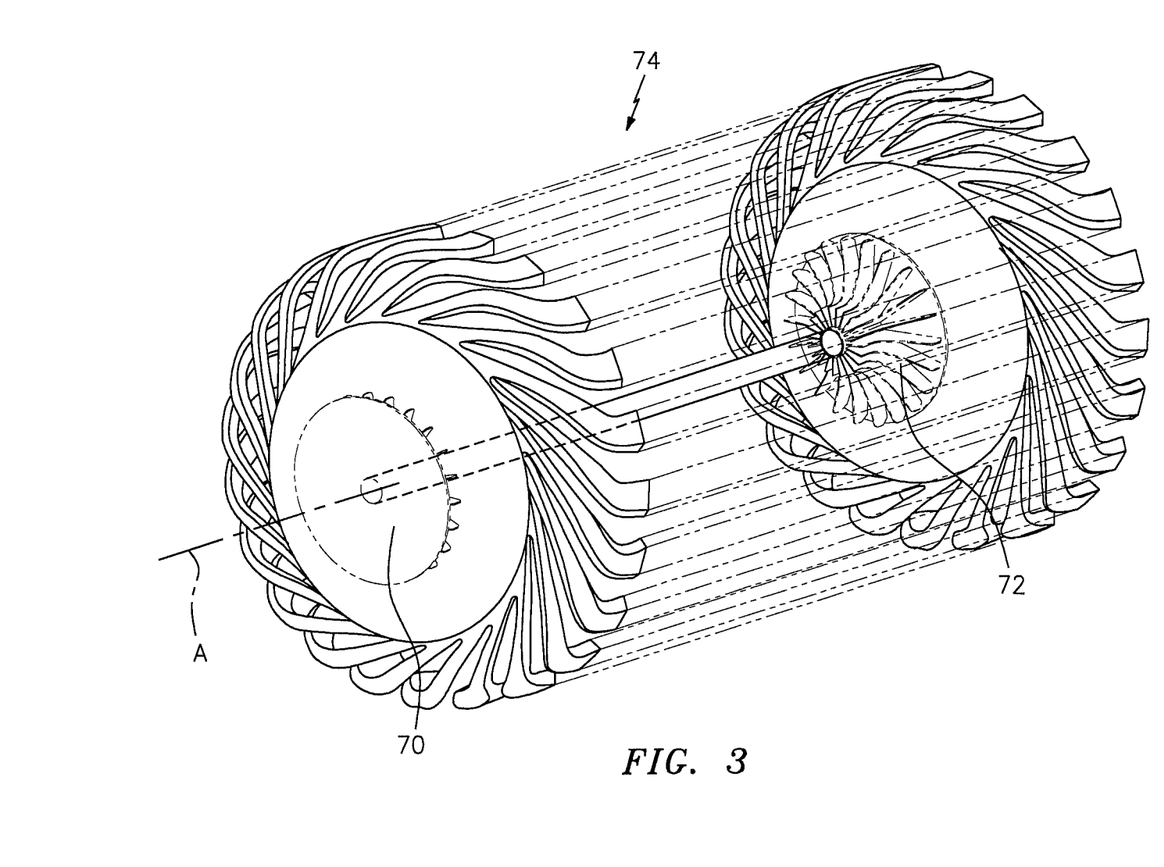
FIG. 3 is a schematic perspective view of the twin centrifugal compressor of the variable cycle gas turbine engine of FIG. 1.

With reference to FIG. 2, the intercooled twin centrifugal compressor 24 includes a forward centrifugal impeller 70, an aft centrifugal impeller 72, a pipe diffuser 74 (also shown in FIG. 3) and a Common Inlet Plenum (CIP) 76. The low spool 40 includes the forward centrifugal impeller 70 and the aft centrifugal impeller 72 on the low shaft 62 in one disclosed non-limiting embodiment. The Common Inlet Plenum (CIP) 76 receives airflow from the second stream airflow path 58 for communication into the forward centrifugal impeller 70 and the aft centrifugal impeller 72. That is, the forward centrifugal impeller 70 and the aft centrifugal impeller 72 are located respectively at the fore end and the aft end of the CIP 76 to provide an equal split of airflow into the gas generator. Each of the forward centrifugal impeller 70 and the aft centrifugal impeller 72 compresses its respective airflow to about the same pressure ratio.

Figure 4:
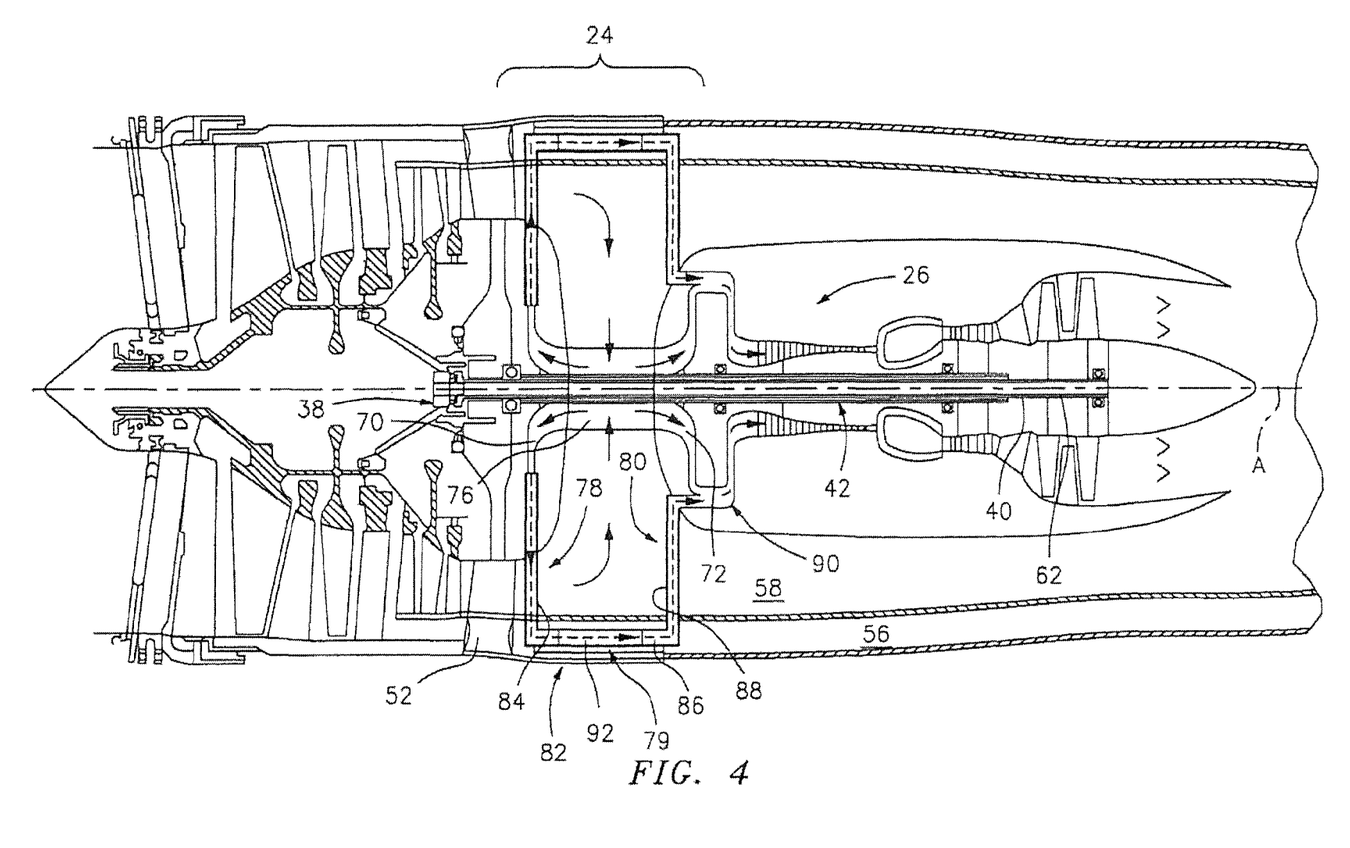
FIG. 4 is a schematic view of an exemplary gas turbine engine according to another non-limiting embodiment with a high spool that includes a forward centrifugal impeller and an aft centrifugal impeller on a high shaft.

In another non-limiting embodiment, the high spool 42 included the forward centrifugal impeller and the aft centrifugal impeller 72 on the high shaft 64 (FIG. 4).

By comparison to a single conventional LPC that compresses the full air flow of the gas generator by the same pressure ratio as the intercooled twin centrifugal compressor 24, each of the forward centrifugal impeller 70 and the aft centrifugal impeller 72 is sized for one-half of the gas generator airflow but the same pressure ratio. That is, the intercooled twin centrifugal compressor 24 provides, for example, a shaft speed that is about 41.4% faster than the single conventional LPC. This enables the HPC to be designed for a shaft speed that is up to about 41.4% faster than the conventional configuration of a single LPC followed by a HPC. This increase in shaft speed improves HPC efficiency since HPC design speed is typically otherwise compromised to a slower speed due to specific speed limitations of the single conventional LPC. As is known in the art, the specific speed is a metric for selecting the rotational speed of a compressor that maximizes efficiency based on the flow rate and pressure ratio required of the compressor. The specific speed is proportional to the compressor design parameters as follows: it is directly proportional to the rotational speed of the shaft; it varies as the square root of the flow rate through the compressor; it varies inversely to the compressor pressure ratio raised to the power of 0.75. The relationship between rotational speed and flow rate is tradable to achieve the same value of specific speed. Replacing the single LPC with the fore and aft centrifugal compressors enables a higher rotational speed that improves the performance of the LPT on the same shaft. Replacing the single LPC with the fore and aft centrifugal compressor enables a higher rotational speed that improves the performance of the LPT on the same shaft or the HPC on the same shaft.

The pipe diffuser 74 generally includes a forward manifold 78 and an aft manifold 80 that respectively receive pressurized airflow from the forward centrifugal impeller 70 and the aft centrifugal impeller 72. The forward manifold 78 communicates through a multiple of manifold pipes 82 that each includes a radial outward pipe 84, an axial pipe 86 and a radial inward pipe 88 (also shown in FIG. 3). The pipe diffuser 74 forms a cage-like screen around the CIP 76 and thereby prevents large-sized foreign object ingestion into CIP 76. It should be understood that various configurations may alternatively be provided.

The radial inward pipes 88 and the aft manifold 80 combine downstream into a full annular duct 90. The full annular duct 90 transports the combined airflow into the HPC 26. The radial outward pipe 84 and the radial inward pipe 88 extend such that the axial pipes 86 are located, in the disclosed non-limiting embodiment, within the third stream airflow path 56. In one disclosed non-limiting embodiment, the axial pipes 86 within the third stream airflow path 56 communicate through an air-to-air heat exchanger 92. As the third stream airflow path 56 is communicated directly from the fan 22, relatively cool airflow is communicated to the air-to-air heat exchanger 92. That is, the third stream airflow path 56 operates as a heat sink to intercool the core airflow through the pipe diffuser 74.

A fraction of the airflow from the second stream airflow path 58 passes around and over the outside of the pipe diffuser 74 and enters radially inward into CIP 76. The remaining fraction of the airflow from the second stream airflow path 58 passes to the mixed airflow exhaust nozzle 59. The second stream airflow path 58 and the pipe diffuser 74 function as a cross-flow heat exchanger that simultaneously pre-heats the airflow that enters the CIP 76 and inter-cools the core airflow within the pipe diffuser 74 prior to entry into the HPC 26.

Intercooling facilitates control of the temperature aft of the twin centrifugal compressor 24 referred to herein as T2.5. As further perspective, T1 is a temperature in front of the fan 22; T2 is a temperature at the trailing edge of the fan 22; T2.5 is the temperature aft of the of the twin centrifugal compressor 24; T3 is the temperature aft of the HPC 26; T4 is the temperature resulting from the combustion 28; T4.5 is the temperature between the HPT 30 and the LPT 32; and T5 is the temperature aft of the LPT 32 (FIG. 1). Mixing one-half of the core airflow from the aft centrifugal impeller 72 with the cooled one-half of the core airflow from the forward centrifugal impeller 70 facilitates the intercooling effect yet facilitates the size minimization of the air-to-air heat exchanger 92. Utilization of the intercooled twin centrifugal compressor 24 as the first compression stage of the HPC 26 facilitates an optimal match of the specific speed of the intercooled twin centrifugal compressor 24 to the mechanical speed of the HPC 26.

Also, consider a gas generator with a single LPC centrifugal compressor and single HPC centrifugal compressor. Typically, the specific speed of the LPC centrifugal compressor is faster than optimum and the specific speed of the HPC centrifugal compressor is slower than optimum. In contrast, the intercooled twin centrifugal compressor 24 configuration facilitates an increase to HPC specific speed toward an optimum level by up to about 41.4% as specific speed decreases by the square root of mass flow [mass flow=50% of total] and increases shaft speed by the reciprocal factor of about 1.414, due to scaling laws.

In another example, consider an intercooled twin centrifugal compressor 24 that reduces the scaled shaft speed from a factor of 1.414 to 1.189. The results are as follows: 1) specific speed of the HPC is about 19% faster than the HPC of the conventional configuration of single LPC plus HPC which is a HPC design improvement; and 2) specific speed of each of the forward centrifugal impeller 70 and the aft centrifugal impeller 72 is about 16% slower than a single, conventional LPC which is also a design improvement. Thus, the intercooled twin centrifugal compressor 24 configuration improves the specific speeds of both the LPC and HPC which results in improved efficiency.

With reference to FIG. 2, the intercooled twin centrifugal compressor 24 includes a forward centrifugal impeller 70, an aft centrifugal impeller 72, a pipe diffuser 74 (also shown in FIG. 3) and a Common Inlet Plenum (CIP) 76. The low spool 40 includes the forward centrifugal impeller 70 and the aft centrifugal impeller 72 on the low shaft 62 in one disclosed non-limiting embodiment.

In another disclosed non-limiting embodiment, the high spool 42 included the forward centrifugal impeller 70 and the aft centrifugal impeller 72 on the high shaft 64 (FIG. 4). The Common Inlet Plenum (CIP) 76 receives airflow from the second stream airflow path 58 for communication into the forward centrifugal impeller 70 and the aft centrifugal impeller 72. That is, the forward centrifugal impeller 70 and the aft centrifugal impeller 72 are located respectively at the fore end and the aft end of the CIP 76 to provide an equal split of airflow into the gas generator. Each of the forward centrifugal impeller 70 and the aft centrifugal impeller 72 compresses its respective airflow to about the same pressure ratio.

By comparison to a single conventional LPC that compresses the full air flow of the gas generator by the same pressure ratio as the intercooled twin centrifugal compressor 24, each of the forward centrifugal impeller 70 and the aft centrifugal impeller 72 is sized for one-half of the gas generator airflow but the same pressure ratio. That is, the intercooled twin centrifugal compressor 24 provides, for example, a shaft speed that is about 41.4% faster than the single conventional LPC. This enables the LPT to be designed for a shaft speed that is up to about 41.4% faster than the conventional configuration of a single LPC followed by a HPC. This increase in low shaft 62 speed improves LPT efficiency since LPT design speed is typically otherwise compromised to a slower speed due to specific speed limitations of the single conventional LPC.

The pipe diffuser 74 generally includes a forward manifold 78 and an aft manifold 80 that respectively receive pressurized airflow from the forward centrifugal impeller 70 and the aft centrifugal impeller 72. The forward manifold 78 communicates through a multiple of manifold pipes 82 that each includes a radial outward pipe 84, an axial pipe 86 and a radial inward pipe 88 (also shown in FIG. 3). The pipe diffuser 74 forms a cage-like screen around the CIP 76 and thereby prevents large-sized foreign object ingestion into the CIP 76. It should be understood that various configurations may alternatively be provided.

The radial inward pipes 88 and the aft manifold 80 combine downstream into a full annular duct 90. The full annular duct 90 transports the combined airflow into the HPC 26. The radial outward pipe 84 and the radial inward pipe 88 extend such that the axial pipes 86 are located, in the disclosed non-limiting embodiment, within the third stream airflow path 56. In one disclosed non-limiting embodiment, the axial pipes 86 within the third stream airflow path 56 communicate through an air-to-air heat exchanger 92. As the third stream airflow path 56 is communicated directly from the fan 22, relatively cool airflow is communicated to the air-to-air heat exchanger 92. That is, the third stream airflow path 56 operates as a heat sink to intercool the core airflow through the pipe diffuser 74.

Airflow from the second stream airflow path 58 passes around and over the outside of the pipe diffuser 74 and enters radially inward into the CIP 76. The second stream airflow path 58 and the pipe diffuser 74 function as a cross-flow heat exchanger that simultaneously pre-heats the airflow that enters the CIP 76 and inter-cools the core airflow within the pipe diffuser 74 prior to entry into the HPC 26.

Intercooling facilitates control of the temperature aft of the twin centrifugal compressor 24 referred to herein as T2.5. As further perspective, T1 is a temperature in front of the fan 22; T2 is a temperature at the trailing edge of the fan 22; T2.5 is the temperature aft of the of the twin centrifugal compressor 24; T3 is the temperature aft of the HPC 26; T4 is the temperature resulting from the combustion 28; T4.5 is the temperature between the HPT 30 and the LPT 32; and T5 is the temperature aft of the LPT 32 (FIG. 1). Mixing one-half of the core airflow from the aft centrifugal impeller 72 with the cooled one-half of the core airflow from the forward centrifugal impeller 70 facilitates the intercooling effect yet facilitates the size minimization of the air-to-air heat exchanger 92.

With reference to FIG. 4, the intercooled twin centrifugal compressor 24 includes a forward centrifugal impeller 70, an aft centrifugal impeller 72, a pipe diffuser 74 and a Common Inlet Plenum (CIP) 76. The high spool 42 includes the forward centrifugal impeller 70 and the aft centrifugal impeller 72. The CIP 76 receives airflow from the second stream airflow path 58 for communication into the forward centrifugal impeller 70 and the aft centrifugal impeller 72. That is, the forward centrifugal impeller 70 and the aft centrifugal impeller 72 are located respectively at the fore end and the aft end of the CIP 76 to provide an equal split of airflow into the gas generator. Each of the forward centrifugal impeller 70 and the aft centrifugal impeller 72 compresses its respective airflow to about the same pressure ratio.

By comparison to a single conventional LPC that compresses the full air flow of the gas generator by the same pressure ratio as the intercooled twin centrifugal compressor 24, each of the forward centrifugal impeller 70 and the aft centrifugal impeller 72 is sized for one-half of the gas generator airflow but the same pressure ratio. That is, the intercooled twin centrifugal compressor 24 provides, for example, a shaft speed that is about 41.4% faster than the single conventional LPC. This enables the LPC to be designed for a shaft speed that is up to about 41.4% faster than the conventional configuration of a single LPC followed by a HPC. This increase in high shaft 64 speed improves HPC efficiency since HPC design speed is typically otherwise compromised to a slower speed due to specific speed limitations of the single conventional LPC. As is known in the art, the specific speed is a metric for selecting the rotational speed of a compressor that maximizes efficiency based on the flow rate and pressure ratio required of the compressor. The specific speed is proportional to the compressor design parameters as follows: it is directly proportional to the rotational speed of the shaft; it varies as the square root of the flow rate through the compressor; it varies inversely to the compressor pressure ratio raised to the power of 0.75. The relationship between rotational speed and flow rate is tradable to achieve the same value of specific speed. Replacing the single LPC with the fore and aft centrifugal compressors enables a higher rotational speed that improves the performance of the HPC on the same shaft.

The pipe diffuser 74 generally includes a forward manifold 78 and an aft manifold 80 that respectively receive pressurized airflow from the forward centrifugal impeller 70 and the aft centrifugal impeller 72. The forward manifold 78 communicates through a multiple of manifold pipes 82 that each includes a radial outward pipe 84, an axial pipe 86 and a radial inward pipe 88 (also shown in FIG. 3). The pipe diffuser 74 forms a cage-like screen around the CIP 76 and thereby prevents large-sized foreign object ingestion into CIP 76. It should be understood that various configurations may alternatively be provided.

The radial inward pipes 88 and the aft manifold 80 combine downstream into a full annular duct 90. The full annular duct 90 transports the combined airflow into the HPC 26. The radial outward pipe 84 and the radial inward pipe 88 extend such that the axial pipes 86 are located, in the disclosed non-limiting embodiment, within the third stream airflow path 56. In one disclosed non-limiting embodiment, the axial pipes 86 within the third stream airflow path 56 communicate through an air-to-air heat exchanger 92. As the third stream airflow path 56 is communicated directly from the fan 22, relatively cool airflow is communicated to the air-to-air heat exchanger 92. That is, the third stream airflow path 56 operates as a heat sink to intercool the core airflow through the pipe diffuser 74.

Airflow from the second stream airflow path 58 passes around and over the outside of the pipe diffuser 74 and enters radially inward into CIP 76. The second stream airflow path 58 and the pipe diffuser 74 function as a cross-flow heat exchanger that simultaneously pre-heats the airflow that enters the CIP 76 and inter-cools the core airflow within the pipe diffuser 74 prior to entry into the HPC 26.

Intercooling facilitates control of the temperature aft of the twin centrifugal compressor 24 referred to herein as T2.5. As further perspective, T1 is a temperature in front of the fan 22; T2 is a temperature at the trailing edge of the fan 22; T2.5 is the temperature aft of the of the twin centrifugal compressor 24; T3 is the temperature aft of the HPC 26; T4 is the temperature resulting from the combustion 28; T4.5 is the temperature between the HPT 30 and the LPT 32; and T5 is the temperature aft of the LPT 32 (FIG. 1). Mixing one-half of the core airflow from the aft centrifugal impeller 72 with the cooled one-half of the core airflow from the forward centrifugal impeller 70 facilitates the intercooling effect yet facilitates the size minimization of the air-to-air heat exchanger 92.

Utilization of the intercooled twin centrifugal compressor 24 as the first compression stage of the HPC 26 facilitates an optimal match of the specific speed of the intercooled twin centrifugal compressor 24 to the mechanical speed of the HPC 26.

Figure 5:
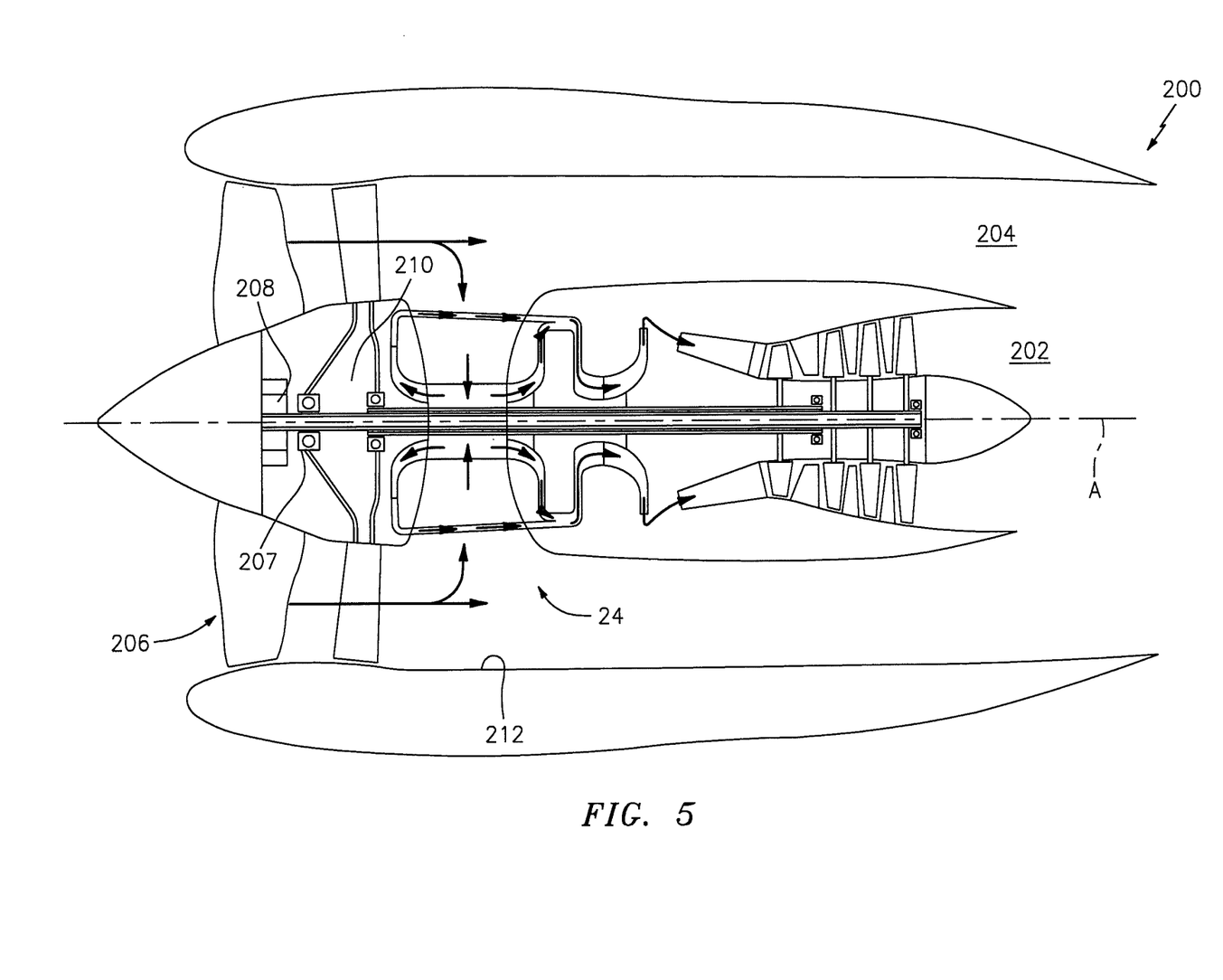
FIG. 5 is a schematic view of an exemplary high bypass turbofan gas turbine engine according to another non-limiting embodiment.

With reference to FIG. 5, in another disclosed non-limiting embodiment, a turbofan 200 with an intercooled twin centrifugal compressor 24 is illustrated. The turbofan 200 in this disclosed non-limiting embodiment is a "fan-high" configuration that need not require a flow splitter and core inlet stator downstream of a fan 206.

The turbofan 200 includes a core primary airflow path 202 and a bypass airflow path 204 from a fan 206 typical of subsonic operation. A low pressure turbine 32 drives the fan 206 directly or through a geared architecture 208 (illustrated schematically) to drive the fan 206 at a lower speed than the low pressure turbine 32. The intercooled twin centrifugal compressor 24 receives airflow from the bypass airflow path 204. That is, a fraction of the airflow from the bypass airflow path 204 enters the CIP 76 in a radially inward direction from an inner diameter 210 of a fan duct 212 around and over the pipe diffuser 74. The remaining fraction of the airflow from the bypass airflow path 204 passes to the airflow exhaust nozzle.

As airflow from the bypass airflow path 204 enters the CIP 76 radially inward from the fan duct 212, ingestion of foreign objects, e.g., birds, ice, stones and sand/dirt particles into the core engine is reduced or eliminated due to the effects of turning a portion of the bypass airflow from an axial direction, i.e., parallel to the engine centerline A to the radially inward direction. Furthermore, the pipe diffuser 74 forms a cage-like screen that operates as a foreign object damage barrier. The architecture also shortens the axial distance between the fan 206 and the fan bearing/strut arrangement 210. This reduces a load path of the fan 206 and increases fan rotor tip clearance control.

Also, consider a gas generator with a single LPC centrifugal compressor and single HPC centrifugal compressor. Typically, the specific speed of the LPC centrifugal compressor is faster than optimum and the specific speed of the HPC centrifugal compressor is slower than optimum. In contrast, the intercooled twin centrifugal compressor 24 configuration facilitates an increase to HPC specific speed toward an optimum level by up to about 41.4% as specific speed decreases by the square root of mass flow [mass flow=50% of total] and increases shaft speed by the reciprocal factor of about 1.414, due to scaling laws.

In another example, consider an intercooled twin centrifugal compressor 24 that reduces the scaled shaft speed from a factor of 1.414 to 1.189. The results are as follows: 1) specific speed of the HPC is about 19% faster than the HPC of the conventional configuration of single LPC plus HPC on the same shaft which is a HPC design improvement; and 2) specific speed of each of the forward centrifugal impeller 70 and the aft centrifugal impeller 72 is about 16% slower than a single, conventional LPC which is also a design improvement. Thus, the intercooled twin centrifugal compressor 24 configuration improves the specific speeds of both the LPC and HPC on the same shaft at higher rotational speed which results in improved efficiency.

Figure 6:
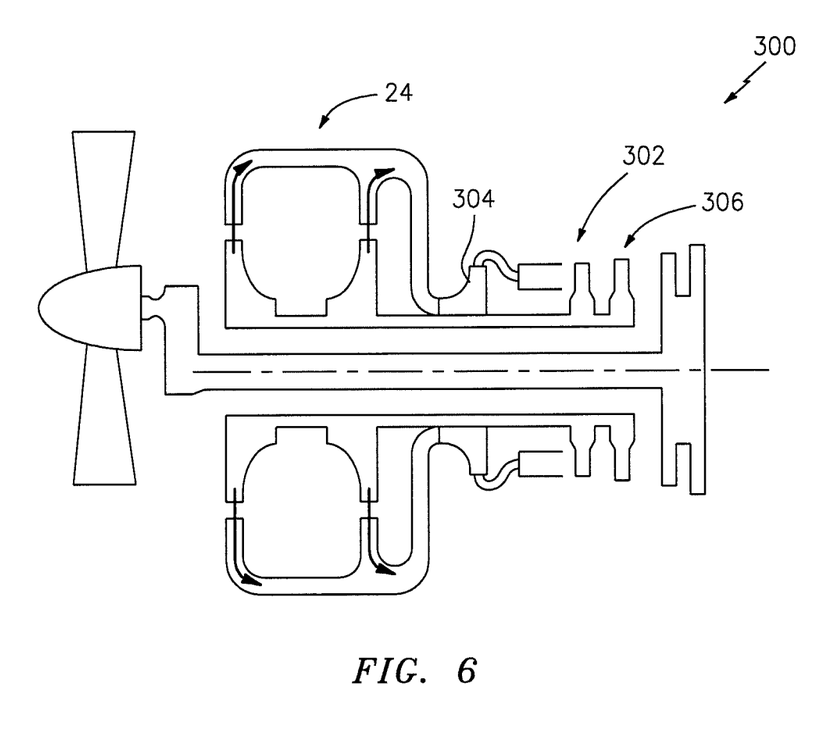
FIG. 6 is a schematic view of an exemplary turbo shaft gas turbine engine according to another non-limiting embodiment.

With reference to FIG. 6, in another disclosed non-limiting embodiment, a turboprop 300 includes an intercooled twin centrifugal compressor 24. The turboprop 300 may be adapted from, for example, the PW127 turboprop, which has three shafts: two shafts define the core engine; and the third/power shaft driven by the power turbine is the innermost shaft (FIG. 7; RELATED ART).

Figure 7:
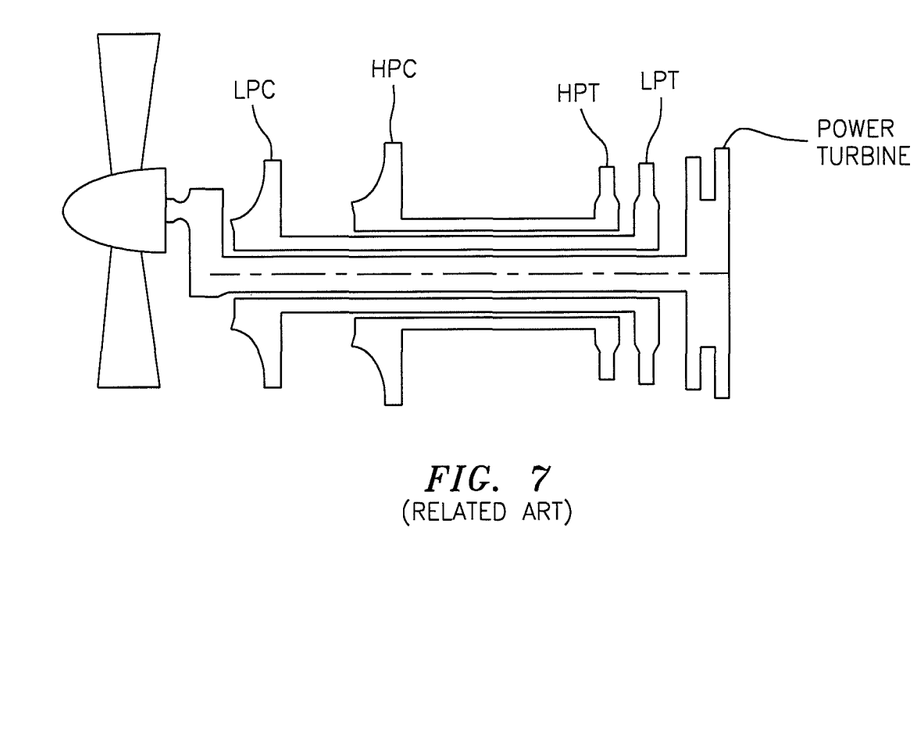
FIG. 7 is a schematic view of a RELATED ART gas turbine engine.

The turboprop 300 in the disclosed non-limiting embodiment locates the intercooled twin centrifugal compressor 24 on a high pressure shaft 302 to feed a high pressure compressor 304 and thereby eliminates the PW127 turboprop low pressure spool. The PW127 turboprop low pressure turbine (LPT; FIG. 7) is replaced by the addition of a stage to the high pressure turbine 306 which alone drives the intercooled twin centrifugal compressor 24 and the high pressure compressor 304 at virtually the same speed as the PW127 turboprop high pressure compressor (HPC) and High pressure turbine (HPT).

It should be appreciated that various other engine architectures such as multistage fans, propfans and unducted fans will benefit herefrom. Furthermore, the last stage of the core compressor can be of any configuration type, to include but not limited to axial flow, mixed flow or centrifugal flow.

It should be understood that relative positional terms such as "forward," "aft," "upper," "lower," "above," "below," and the like are with reference to the engine but should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
    an intercooled twin centrifugal compressor; and
    a pipe diffuser that extends from said intercooled twin centrifugal compressor into an airflow path,
    wherein said pipe diffuser extends around a Common Inlet Plenum in communication with said intercooled twin centrifugal compressor.

2. The gas turbine engine as recited in claim 1, further comprising:
    an outer case structure; and
    an intermediate case structure,
    wherein said airflow path is defined by the outer case structure and the intermediate case structure.

3. The gas turbine engine as recited in claim 2, further comprising:
    an inner case structure.

4. The gas turbine engine as recited in claim 1, wherein said airflow path is a bypass airflow path.

5. The gas turbine engine as recited in claim 1, wherein said intercooled twin centrifugal compressor includes a forward centrifugal impeller and an aft centrifugal impeller located respectively at the fore end and aft end of said Common Inlet Plenum.

6. The gas turbine engine as recited in claim 5, wherein said forward centrifugal impeller communicates with said aft centrifugal impeller through said pipe diffuser.

7. The gas turbine engine as recited in claim 6, wherein said pipe diffuser includes a forward manifold and an aft manifold.

8. The gas turbine engine as recited in claim 7, wherein said forward manifold includes a multiple of manifold pipes, each of said multiple of manifold pipes includes a radial outward pipe, an axial pipe downstream of said radial outward pipe and a radial inward pipe downstream of said axial pipe.

9. The gas turbine engine as recited in claim 8, wherein said radial inward pipe and said aft manifold combine downstream into a full annular duct.

10. The gas turbine engine as recited in claim 9, wherein said full annular duct communicates with a second compressor axially aft of said intercooled twin centrifugal compressor.

11. The gas turbine engine as recited in claim 8, further comprising a heat exchanger within said airflow path, said heat exchanger in communication with said axial pipe.

12. The gas turbine engine as recited in claim 11, further comprising:
    an outer case structure; and
    an intermediate case structure,
    wherein said airflow path is defined by the outer case structure and the intermediate case structure.

13. The gas turbine engine as recited in claim 12, further comprising:
    an inner case structure.

14. The gas turbine engine as recited in claim 1, further comprising a heat exchanger within said airflow path, said heat exchanger in communication with said pipe diffuser.

15. The gas turbine engine as recited in claim 14, further comprising:
    an outer case structure;
    an intermediate case structure; and
    an inner case structure,
    wherein said airflow path is defined by the outer case structure and the intermediate case structure.

16. A method of operating a gas turbine engine comprising:
    extending a pipe diffuser from an intercooled twin centrifugal compressor into an airflow path; and
    mixing half of a core airflow from the intercooled twin centrifugal compressor with a cooled half of the core airflow from the intercooled twin centrifugal compressor.

17. The method as recited in claim 16, wherein the gas turbine engine includes an outer case structure and an intermediate case structure, and wherein the airflow path is defined by the outer case structure and the intermediate case structure.

18. The method as recited in claim 17, further comprising:
    communicating the pipe diffuser with a heat exchanger within the airflow path.

19. The method as recited in claim 16, wherein said mixing occurs upstream of a second compressor that is located axially aft of said intercooled twin centrifugal compressor.

20. A gas turbine engine comprising:
    an intercooled twin centrifugal compressor; and
    a pipe diffuser that extends from said intercooled twin centrifugal compressor into an airflow path,
    wherein said pipe diffuser foul's a screen around a Common Inlet Plenum in communication with said intercooled twin centrifugal compressor.

* * * * *

UNITED STATES PATENT AND TRADEMARK OFFICE
CERTIFICATE OF CORRECTION

PATENT NO. : 9,752,585 B2  
APPLICATION NO. : 14/209326  
DATED : September 5, 2017  
INVENTOR(S) : Daniel B. Kupratis Page 1 of 1

It is certified that error appears in the above-identified patent and that said Letters Patent is hereby corrected as shown below:

In the Claims

Column 20, Line 49, please delete "foul's" and insert --forms--

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*